United States Patent
Pletta et al.

[11] Patent Number: 5,986,439
[45] Date of Patent: Nov. 16, 1999

[54] METHOD OF CONTROLLING AN AUTOMOTIVE CHARGING SYSTEM IN RESPONSE TO TRANSIENT ELECTRICAL LOADS

[75] Inventors: Keith B. Pletta, Shelby Township; Glen E. Tallarek, Grosse Pointe Woods; Joseph B. Adams, Northville; Michael S. Boggess, Clarkston, all of Mich.

[73] Assignee: Chrysler Corporation, Auburn Hills, Mich.

[21] Appl. No.: 09/097,119

[22] Filed: Jun. 12, 1998

[51] Int. Cl.$^6$ .................................. H02H 7/06; H02P 9/10
[52] U.S. Cl. .................................. 322/59; 322/18; 322/36
[58] Field of Search .................................. 322/18, 36, 37, 322/59; 320/157

[56] References Cited

U.S. PATENT DOCUMENTS

| | | |
|---|---|---|
| 4,659,977 | 4/1987 | Kissel et al. . |
| 4,719,573 | 1/1988 | Kissel et al. . |
| 5,235,946 | 8/1993 | Fodale et al. . |
| 5,249,559 | 10/1993 | Weber et al. . |
| 5,427,082 | 6/1995 | Thomas et al. . |
| 5,469,826 | 11/1995 | Thomas et al. . |
| 5,492,102 | 2/1996 | Thomas et al. . |
| 5,517,964 | 5/1996 | Chen et al. . |

*Primary Examiner*—Nestor Ramirez
*Assistant Examiner*—Peter Medley
*Attorney, Agent, or Firm*—Mark P. Calcaterra

[57] ABSTRACT

A method of regulating voltage output from an alternator of a vehicle charging system is provided in response to transient alternator loads during idle speed operating conditions. The method comprises the steps of: (a) delivering a first alternator field control signal to the alternator; (b) detecting an impulse electrical load based on a variation in battery voltage; and (c) gradually increasing the alternator field control signal duty-cycle over a time period, such that the time period is based on the magnitude of the alternator field control signal duty-cycle, with respect to a maximum alternator field control signal duty-cycle, and based on the engine rotational speed of the vehicle, thereby regulating voltage output and torque load of the alternator. More specifically, the variation in battery voltage is the difference between a measured battery voltage and an average delta battery voltage, where the average delta battery voltage is indicative of the change in battery voltage over a period in time, and the duty-cycle of the alternator field control signal is incremented by a predefined amount until it reaches a maximum value or until a calculated average battery voltage is substantially equal to a predefined voltage regulator set point value. In addition, the first alternator field control signal is delayed for a preliminary period after the step of detecting a variation in battery voltage to minimize battery voltage drop.

12 Claims, 5 Drawing Sheets

METHOD OF CONTROLLING AN AUTOMOTIVE CHARGING SYSTEM IN RESPONSE TO TRANSIENT ELECTRICAL LOADS

BACKGROUND OF THE INVENTION

1. Field of the Invention

The present invention relates generally to a method of controlling an automotive charging system, and more particularly to a method of controlling current flow into an alternator field circuit and thereby controlling the electrical output of the alternator in response to impulse and/or transient electrical loads during idle speed conditions of a motor vehicle.

2. Discussion

It is becoming difficult to calibrate automatic idle speed (AIS) compensation for varying alternator loads, primarily due to ever increasing vehicle electrical loads that make it necessary to use larger amperage alternators (i.e., larger torque loading), larger intake manifolds creating a larger delay time in engine RPM response to AIS steps, smaller capacity batteries that have less capacity to handle current draws, and lower engine idle speeds resulting in alternator operation at less efficient speeds. Due to their inability to respond well to the periodic application of impulse electrical loads (e.g., the activation of the radiator fan), current methods for controlling the alternator field have been determined to be a primary cause of highly unacceptable engine speed fluctuations and other system instabilities at idle speed conditions.

Regulating the battery voltage level during vehicle operation consists of controlling the electrical current supplied to the alternator field circuit. This electrical current creates a magnetic field in the alternator that is proportional to the magnitude of the current. The magnitude of the magnetic field and the rotational speed of the alternator together determine the output of the alternator. The electrical field current is controlled and delivered by the powertrain control module (PCM). The PCM approximates a variable direct current by delivering a pulsewidth modulated control signal to the alternator field circuit. In a steady-state mode, alternator field control is accomplished by driving the alternator field control output pin of the microprocessor in the PCM to a prescribed ON/OFF pattern that effectively delivers one of several different duty-cycles (i.e., 0%, 12.5%, 25%, 50%, 75%, 87.5%, 100%). Periodically, for example once every 3.5 mS, the appropriate duty-cycle is chosen based on the magnitude of the difference between the most recent "trimmed" battery voltage level (from an AND conversion that occurs in the same routine once every 3.5 mS) and a desired operational battery voltage value, also referred to as the voltage regulator set point. However, missing from this control process is consideration of electrical load levels on the engine system at the time and also consideration of the engine speed at the time. As a result, the current control methods poorly manage the application of higher alternator field duty-cycles in response to impulse electrical loads (such as the activation of the radiator fan, the rear window heater, or the window motors), and it is this deficiency that has been determined to be the main cause of engine speed instability during idle speed conditions.

The problem that is caused by impulse or transient electrical loads is a result of how the system battery voltage drops (when they are applied) and how the control system detects and responds to these system battery voltage fluctuations. For instance, when the radiator fan is turned "on," the large in-rush of current that occurs because of the initial low impedance of the fan motor causes the system battery voltage to drop by a significant amount over a very short period of time. When the control system detects the system battery voltage drop, it attempts to recover by immediately increasing the alternator field current control duty cycle. This increase in alternator field current control duty cycle causes a proportional torque load on the engine as the alternator works to increase its output and restore the system battery voltage to its desired control value.

Current charging system control methods employ different strategies for managing the application of impulse loads and attempt to limit the corresponding maximum alternator field current control duty-cycle to avoid engine stall. These strategies produce undesirable engine speed fluctuations or undesirable dimming of headlamp and instrument panel lights. For example, when the control system determines that the radiator fan needs to be turned "on," it will open the AIS a prescribed number of steps and then delay a prescribed length of time before turning the radiator fan "on." This strategy effectively minimizes the possibility of the engine stalling when the radiator fan is turned "on" while operating at low engine speeds. It causes the engine speed to flare slightly before dropping sharply when the radiator fan is finally turned "on." It should be noted that this approach does not really make the idle speed any more stable, it merely makes the idle speed fluctuate above and below a target idle speed to prevent engine stall.

Therefore, it would be desirable to provide a method of controlling the alternator field current which would result in regulating the voltage in an automotive charging system in response to transient electrical loads. The method of the present invention will control current flow into an alternator field circuit during idle speed operating conditions, and thus regulate alternator output and engine torque loading to achieve an acceptable balance between engine speed fluctutation and system battery voltage drop. Upon detecting an impulse electrical load, the alternator field current flow will be gradually increased over a period of time based on the engine's rotational speed and also based on the magnitude of the delivered duty-cycle with respect to a maximum duty-cycle value. The new method effectively reduces engine speed and system voltage fluctuations that normally accompany the application of transient or impulse electrical loads. As these fluctuations are reduced, the noticeable side-effects are reduced, including changes in headlight, interior light and instrument panel light intensity, blower motor speed, and engine noise and vibration.

SUMMARY OF THE INVENTION

It is a principle object of the present invention to improve customer perceivable engine idle speed and system battery voltage stability under impulse or transient electrical loads and to reduce the risk of engine stall-out that could result from the sudden application of relatively large electrical loads.

It is another object to enable the use of larger amperage alternators on smaller displacement engines.

It is again another object to improve fuel economy of a vehicle by enabling the engine systems to operate satisfactorily at lower engine idle speeds.

It is still another object to enable the use of higher current draw powertrain control devices (radiator fans, etc.) without having to incorporate special auxiliary electrical load control devices (e.g., PWM relays).

It is yet another object to lower the control system's reliance on the automatic idle speed (AIS) control system to handle the engine speed fluctuations that result from the application of transient and/or impulse electrical loads.

In one form, the present invention provides a method of regulating electrical output from an alternator of a vehicle charging system in response to transient alternator loads during idle speed operating conditions, comprising the steps of: (a) delivering a first control signal to the alternator field circuit; (b) detecting an impulse electrical load based on a variation in battery voltage; and (c) gradually increasing the duty-cycle of the alternator field control signal over a time period, wherein the time period is based on the engine's rotational speed as well as on the duty-cycle of the alternator field control signal with respect to a maximum duty-cycle, thereby regulating voltage output of the alternator.

More specifically, the variation in battery voltage, referred to as a delta-delta battery voltage, is the difference between a measured battery voltage and an average delta battery voltage, where the average delta battery voltage is the average difference between the current measured battery voltage and the current voltage regulator set point value. When the delta-delta battery voltage indicates a significant difference, the control method is initiated. First, the alternator field control signal duty cycle is allowed to rise rapidly for a preliminary hold-off time period. This causes the alternator field current to rise rapidly creating a "priming" effect which allows the system to utilize the rotational inertia of the engine system to immediately start creating more output energy to reduce further battery voltage drop without significantly affecting the engine's rotational speed. After the preliminary hold-off delay, the control signal duty cycle is restored to its pre-trigger value. Thereafter, the control signal duty cycle is incremented by a predetermined percentage once per a predetermined time period until the duty cycle reaches a maximum value or a measured battery voltage is substantially equal to a predetermined level (e.g., the current voltage regulator set point).

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
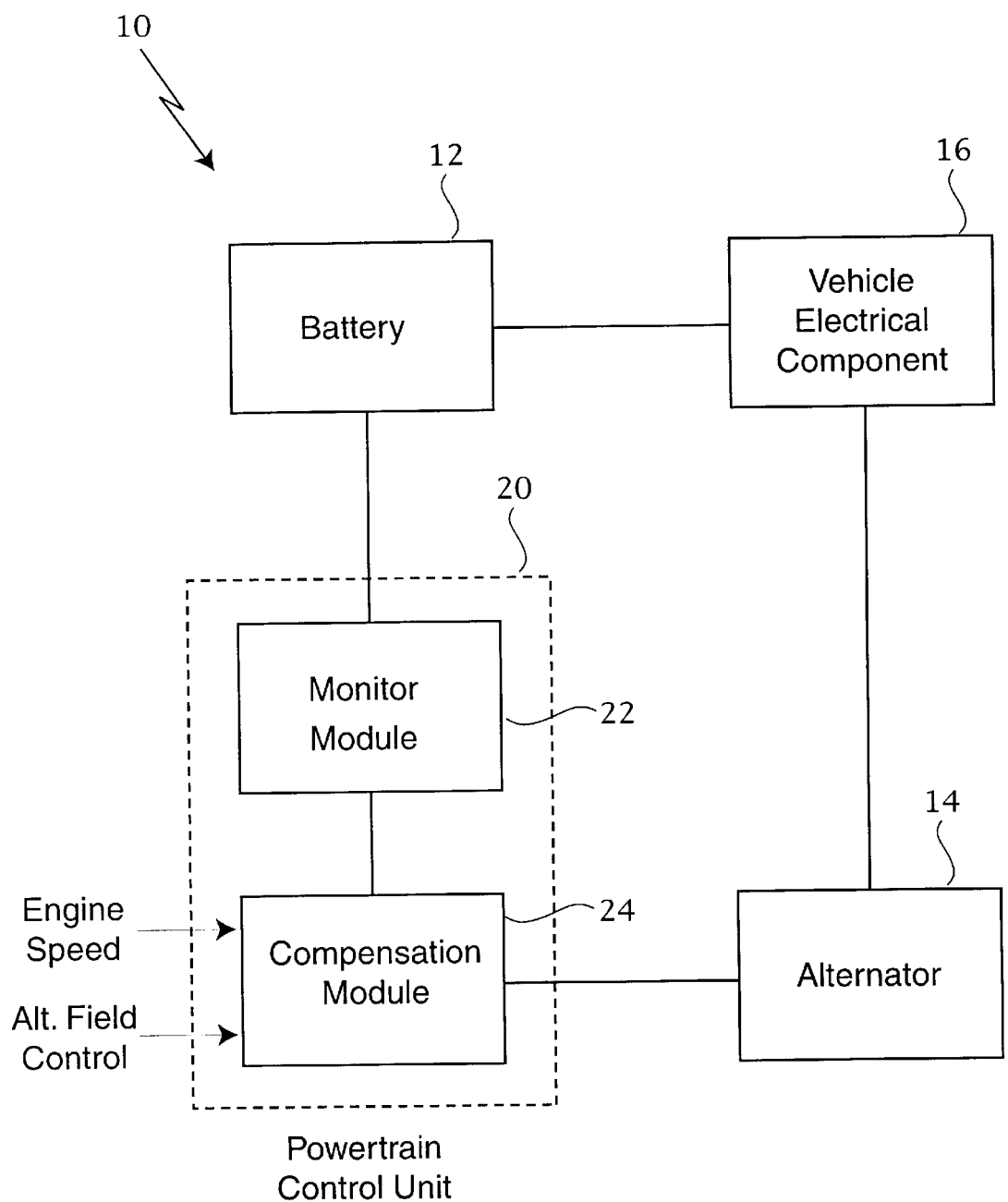
FIG. 1 is a diagram showing the basic components of an automotive charging system.
Figure 2A:
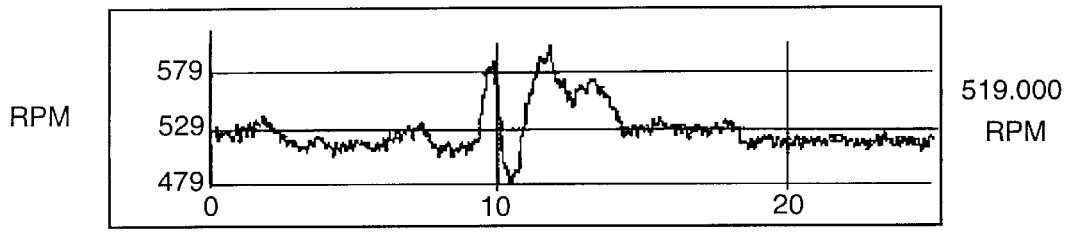
FIGS. 2A–2D are a compilation of four graphs showing the impact of an impulse electrical load on an a motive charging system under a prior art control method during idle speed conditions.
Figure 2B:
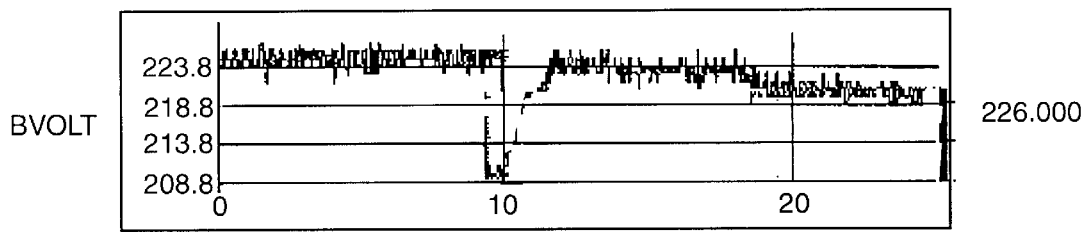
Figure 2C:
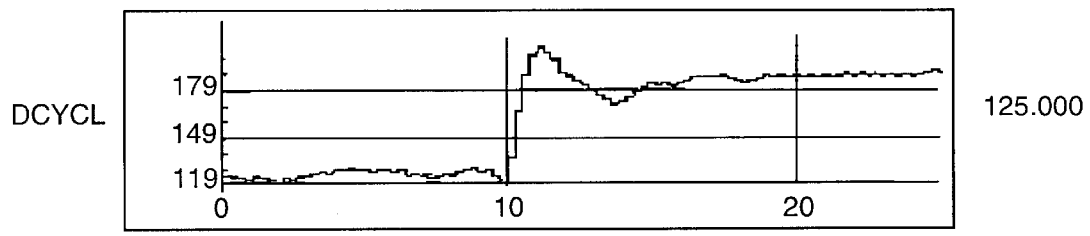
Figure 2D:
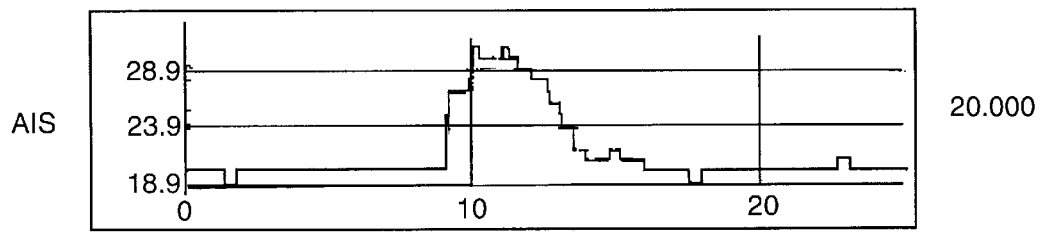

The basic components of an automotive charging system 10 are illustrated in FIG. 1. Automotive charging system 10 comprises a battery 12, an alternator 14, a powertrain control unit 20 and at least one electrical component 16 (e.g., headlights or radiator fan). Electrical component 16 receives an output voltage from either of the battery 12 or alternator 14, such that activation of the component may cause an impulse electrical load on charging system 10.

In accordance with the present invention, a method for controlling current flow into an alternator field circuit is implemented in control unit 20, thereby controlling the electrical output of the alternator in response to impulse electrical loads within the vehicle. Control unit 20 includes a monitor module 22 connects to battery 12 for detecting transient electrical load conditions and a compensation module 24 connected to both alternator 14 and monitor module 22 for regulating output voltage by delivering a pulsewidth modulated control signal to the alternator field circuit. Engine speed and the magnitude of the alternator field control signal serve as additional inputs to compensation module 24.

FIGS. 2A–2D are a compilation of four graphs showing the impact of an impulse electrical load on an automotive charging system under a prior art control method. Engine speed (in RPM), battery voltage (in 60 mV/count), delivered duty-cycle to alternator field circuit (in 0.39%/count), and AIS compensation (in steps) are each plotted from top to bottom in FIGS. 2A–2D, respectively, against time during an idle speed condition of a test vehicle. An impulse electrical load (i.e., a low speed fan off-to-on transition) is introduced into the system at 10 seconds causing a 15 count (i.e., 900 mV) drop in battery voltage and a 120 rpm fluctuation in engine speed. Thus, these graphs illustrate the instability of the charging system under the prior art control techniques.

In the present invention, an alternator control method is implemented in an engine control unit for controlling current flow into an alternator field circuit in response to transient electrical loads. Generally, the alternator control method has two operational routines commonly referred to as "normal duty-cycle regulation" and "cold engine alternator load delay" (not discussed). When the vehicle is operating under idle speed conditions, the normal regulation routine is executed once every predetermined time period (for example, once every 3.5 mS). During steady-state electrical loads (as previously described), the routine compares a "trimmed" battery voltage value to a voltage regulator set point and then determines one of several duty cycle patterns that are then delivered to the alternator field port. Within this normal regulation routine is a call to a "transient load compensation" subroutine, and it is this subroutine that replaces the prior art alternator field control methods that were intended to manage the alternator field when significant transient electrical loads occurred in the system.

Figure 3:
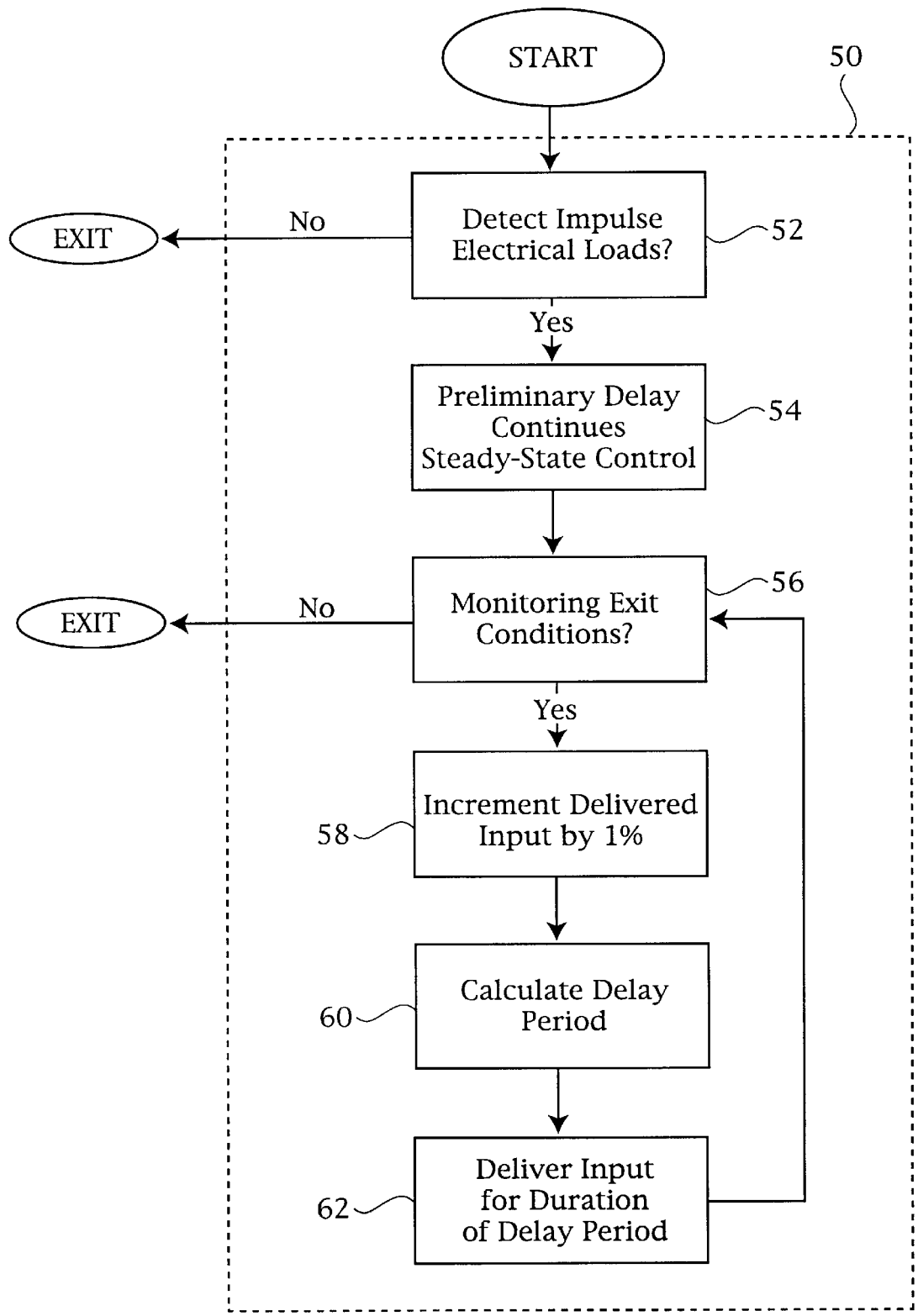
FIG. 3 is a block diagram showing a method of controlling current flow from an alternator in an automotive charging system during transient electrical loads.
Figure 4A:
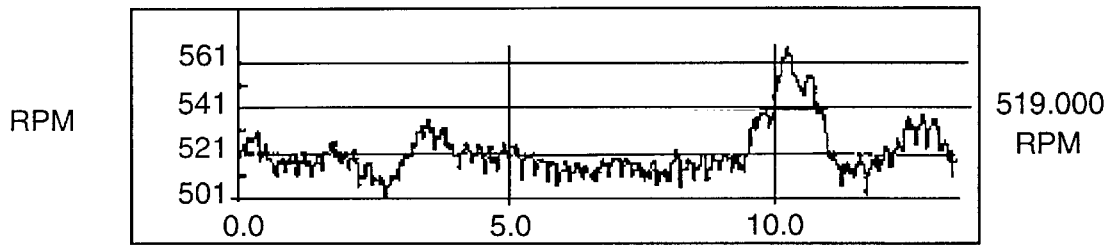
FIGS. 4A–4D are a compilation of four graphs showing the impact of an impulse electrical load on an automotive charging system under the transient alternator control method of the present invention during idle speed conditions.
Figure 4B:
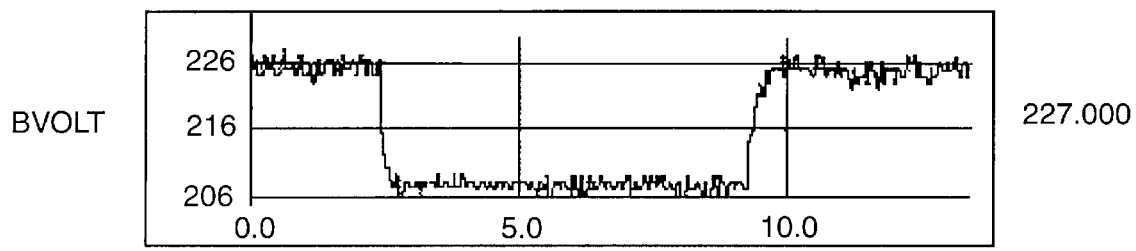
Figure 4C:
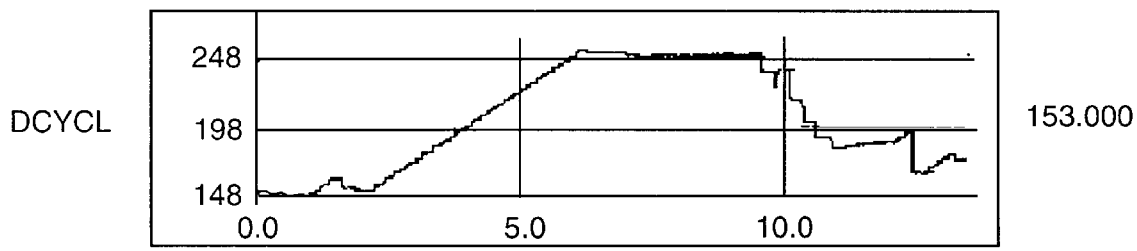
Figure 4D:
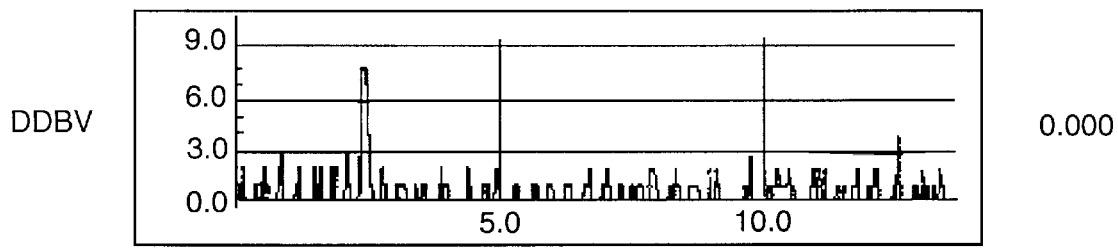

An overview of the transient load compensation control methodology 50 is shown in FIG. 3. Transient load compensation begins when the system detects at 52 a significant drop in the battery voltage over a short period of time, but otherwise exits to continue normal regulation processing. A preliminary delay 54 allows the normal steady-state control to quickly increase the amount of current flowing into the alternator field circuit, and thus cause a "priming" effect of the field current in the system. During this delay (and throughout transient load processing), conditions that cause transient loads compensation to be exited are monitored at 56 and, if met, processing returns to the normal regulation routine. Compensation processing continues until either the duty-cycle reaches a maximum value (e.g., 100%) or until an averaged battery voltage level reaches a predetermined level (i.e., the voltage regulator set point).

After the preliminary delay period has expired, transient load compensation takes control of the alternator field duty-cycle. It begins by delivering an alternator field control signal based on an originally calculated averaged duty-cycle (from the stead-state operation before the detection of the transient electrical load). Next, the current duty-cycle alternator field control signal is incremented at 58 in 1% steps and a new time period is calculated at 60, such that the time period is based on the engine speed and the % duty cycle currently being delivered. Increasing the alternator field control signal duty-cycle causes the application of greater and greater alternator torque load on the engine. Therefore, a ramp-up approach is employed because the increase of the alternator field control signal duty-cycle should be slower at lower engine speeds and it should slow down as the system approaches a 100% duty-cycle. An incremented duty-cycle is delivered at 62 for the new time period, and ramping-up continues until one of the exit conditions is achieved.

FIGS. 4A–4D are a compilation of four graphs showing the impact of an impulse electrical load on an automotive charging system under the transient load control methodology of the present invention. Engine speed (in RPM), battery voltage (in 60 mV/count), delivered duty-cycle to alternator field circuit (in 0.39%/count), and the computed "delta-delta battery voltage" value (as shown from top to bottom, repsectively) are each plotted against time during an idle speed condition of the tested vehicle. In this case, the impulse electrical load is introduced into the system at about 2.5 Sec, thus causing a significant spike in the delta-delta battery voltage value. Although this load causes a 20 count (i.e., 1.2 V) drop in battery voltage, there is only negligible fluctuation (60 rpm) in engine speed (without any AIS compensation). Therefore, these graphs illustrate greater rotational and electrical stability in the engine system under the transient load control method of the present invention.

Figure 5:
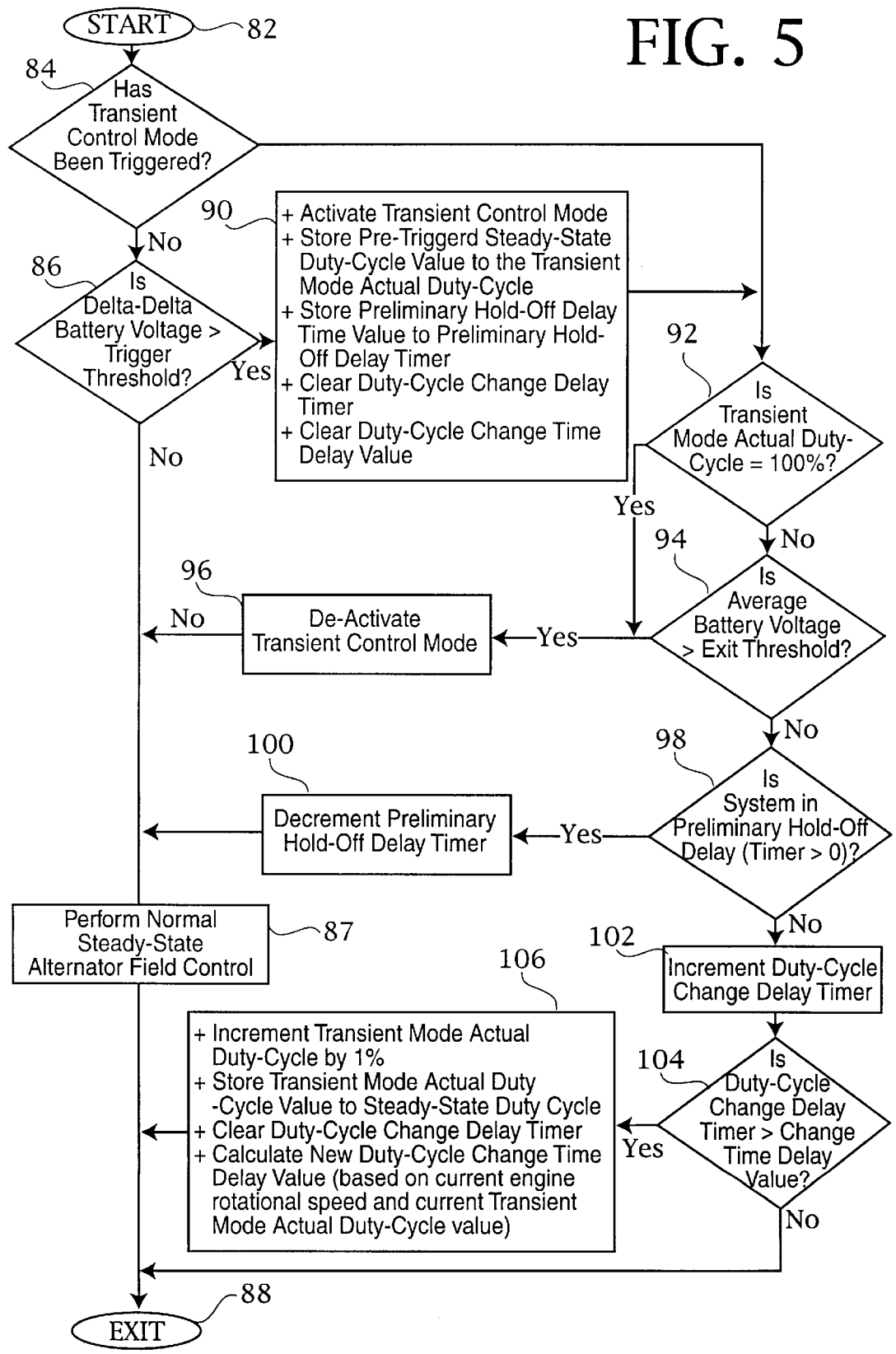
FIG. 5 is a detailed flow chart illustrating a preferred embodiment of the method of regulating voltage output from an alternator in an automotive charging system during transient electrical loads.

A preferred embodiment of the transient load control methodology is described in greater detail in conjunction with FIG. 5. As previously mentioned, the transient load compensation subroutine 80 is called by the main processing loop of the normal regulation routine, and thus is called once every predetermined time period (for example, once every 3.5 mS). Start block 82 signifies the beginning of the transient load compensation processing. Decision block 84 evaluates whether a transient load condition has previously been detected so that it can proceed directly to compensation processing in block 92, but otherwise block 86 determines if an impulse electrical load has occurred in the system. If the "delta-delta battery voltage" value (that was calculated in a support routine as discussed below), is less than or equal to the prescribed "delta-delta battery voltage trigger threshold" value, then the subroutine performs the normal steady-state control in block 87 and then exits in block 88. However, if the "delta-delta battery voltage" value is greater than the "delta-delta battery voltage trigger threshold" value, then transient load compensation begins in block 90. Block 90 performs various housekeeping functions, including setting the "Transient Loads Compensation Mode" flag bit to indicate that the mode is active, taking the most recently calculated alternator field "average" duty cycle value (which is continuously calculated in the main processing loop) and storing it to the new "desired actual alternator field duty-cycle" location, initiating the "Preliminary Hold-Off Delay" by storing the "hold-off delay time" value to the "preliminary hold-off delay timer," clearing the "duty-cycle change delay timer," and clearing the "adjusted duty-cycle change delay time." The control then resumes at block 92.

Next, system conditions are evaluated to determine if transient load compensation subroutine 80 should be terminated and exited. Transient load compensation mode will be exited if either of the following conditions becomes true: (1) the actual desired alternator duty-cycle value reaches 100% in block 92, or (2) the average battery voltage value reaches or exceeds the battery voltage exit threshold (for example, the voltage regulator "set-point" minus 0.18 V) in block 94. If either of these conditions become true at any time, then "transient loads compensation mode" will be terminated. In block 96, the "Transient Loads Compensation Mode" flag bit is cleared to indicate that the mode is inactive. The algorithm then continues to block 87 where it resumes the normal steady-state alternator field control before exiting in block 88.

Returning to the recursive portion of transient control routine 80, transient control processing is initially delayed. During this preliminary delay time, the normal steady-state alternator control routine is allowed to react to the sudden drop in battery voltage by driving the alternator field duty-cycle towards 100% almost immediately. This behavior causes a "priming" effect on the alternator and allows the magnetic field within the alternator to begin increasing in magnitude. This priming effect takes advantage of the rotational inertia of the engine to help minimize total battery voltage drop for the overall event. The duration of the "preliminary hold-off delay" is relatively short (preferably on the order of 30–40 mS) so the engine speed is not greatly affected. Decision block 98 evaluates this preliminary delay, such that the non-zero state of the delay timer is an indication that the preliminary hold-off delay is active. After the hold-off delay has been initiated and until the timer reaches zero, block 100 will decrement the timer by one on every execution of this routine. During this delay, the conditions that cause the transient loads compensation mode to be exited are monitored. Once the timer reaches zero, then transient control routine 80 will take control of the alternator field duty-cycle and begin to ramp it up at a prescribed rate.

After the preliminary delay period and if the exit conditions are not true, block 102 increments the "duty-cycle change delay timer" value once every execution. Decision block 104 determines when the duty-cycle change delay timer reaches the "adjusted duty-cycle change delay time" value. When the timer reaches the adjusted delay time value, block 106 increments the "desired actual alternator field duty-cycle" value by a predetermined percentage (preferably 1%), stores the new "desire actual alternator field duty-cycle" to the "steady-state alternator field duty-cycle" (to be delivered to the alternator field circuit), clears the "duty-cycle change delay timer" (to begin the delay for the next duty-cycle change), and then calculates a new "adjusted duty-cycle change delay time." The primary basis for the new "adjusted duty-cycle change delay time" is derived from a calibration table as a function of engine rotational speed. This value is modified by a multiplicative factor that is derived from another calibration table as a function of actual alternator field duty-cycle.

Additional support subroutines for calculating values that are to be used in the transient loads compensation subroutine have been added to the normal background routine which executes on a longer interval (for example, once every 12.5 mS); but otherwise the routine for processing steady-state conditions has not been altered to implement the present invention.

While the above description constitutes the preferred embodiment of the invention, it will be appreciated that the invention is susceptible to modification, variation, and change without departing from the proper scope or fair meaning of the accompanying claims.

We claim:

1. A method of regulating voltage output from an alternator of a vehicle charging system in response to transient alternator loads during idle speed operating conditions, comprising the steps of:

(a) delivering a first field control signal to the alternator;

(b) detecting an impulse electrical load based on a variation in battery voltage;

(c) continuing to deliver said first field control signal for a preliminary delay period after detecting the impulse electrical load, thereby minimizing the drop in battery voltage; and (d) gradually increasing said field control signal over a time period, wherein said time period is based on the engine rotational speed of the vehicle and based on the magnitude of said field control signal with respect to a maximum field control signal, thereby regulating voltage output from the alternator.

2. The method of claim 1 wherein said first alternator field control signal is based on the difference between a measured battery voltage and a predefined voltage regulator set point value.

3. The method of claim 1 wherein said variation in battery voltage is the difference between a measured battery voltage and an average delta battery voltage, said average delta battery voltage being indicative of the change in battery voltage over a period of time.

4. A method of controlling current flow into an alternator in a motor vehicle during transient alternator loads and operating in an idle speed condition, comprising the steps of:

(a) delivering a first alternator field control signal to the alternator;

(b) detecting a variation in battery voltage which is indicative of a transient or impulse electrical load;

(c) continuing to deliver said first alternator field control signal for a preliminary delay period after detecting the variation in battery voltage;

(d) incrementing a duty-cycle of said first alternator field control signal to provide a second alternator field control signal;

(e) determining a time period based upon duty-cycle of said second alternator field control signal and the engine rotational speed of said vehicle; and (f) applying said second alternator field control signal to the alternator for said time period, thereby controlling the current flow into the alternator.

5. The method of claim 4 further comprising the step of:

performing steps (d)–(f) until said alternator field control signal reaches at least one of a maximum value and a calculated average battery voltage is substantially equal to a predefined voltage regulator set point value.

6. The method of claim 4 wherein said first alternator field control signal being a pulsewidth modulated signal to the field circuit of the alternator and said modulated signal is based on the difference between a measured battery voltage and a predefined voltage regulator set point value.

7. The method of claim 4 wherein said variation in battery voltage being the difference between a measured battery voltage and an average delta battery voltage, said average delta battery voltage being indicative of the change in battery voltage over a period in time.

8. The method of claim 4 wherein the step of incrementing a duty-cycle of said first alternator field control signal being further defined as incrementing the duty-cycle by a predefined amount of said first alternator field control signal.

9. An apparatus for regulating output voltage from a charging system, having a battery and an alternator, of a motor vehicle operating in an idle speed condition, comprising:

a monitor module receiving electrical signals from the battery for detecting transient electrical loads on the charging system;

a vehicle electrical component connected to at least one of the alternator and the battery for receiving output voltage from the charging system, whereby activation of said electrical component causes an impulse electrical load on the charging system;

a steady-state module connected to the alternator for delivering said alternator field control signal to the alternator field circuit during substantially steady electrical loads on the charging system, whereby said steady-state module delivers said alternator field control signal for a preliminary delay period after said monitor module detects said impulse electrical load; and a compensation module connected to the alternator and said monitor module for gradually increasing a duty-cycle of a field control signal to the alternator field circuit over a time period in response to said impulse electrical load, said time period being based on the magnitude of the duty-cycle of said alternator field control signal with respect to a maximum duty-cycle of said alternator field control signal and based on the engine speed of the vehicle, thereby regulating output voltage of the charging system.

10. The apparatus of claim 9 wherein said monitor module detects transient electrical loads based on a variation between a measured battery voltage and an average delta battery voltage, said average delta battery voltage being indicative of the change in battery voltage over a period of time.

11. The apparatus of claim 9 wherein said alternator field control signal is based on the difference between a measured battery voltage and a predefined voltage regulator set point value.

12. The apparatus of claim 9 wherein said gradually increasing a duty-cycle of an alternator field control signal is further defined as incrementing the duty-cycle by a predefined amount of said field control signal.

* * * * *